(12) United States Patent
Kolding et al.

(10) Patent No.: US 12,452,813 B2
(45) Date of Patent: Oct. 21, 2025

(54) APPLICATION FUNCTION INFLUENCING INTRA-5G PROPAGATION DELAY COMPENSATION

(71) Applicant: NOKIA TECHNOLOGIES OY, Espoo (FI)

(72) Inventors: Troels Emil Kolding, Klarup (DK); Devaki Chandramouli, Plano, TX (US); Pilar Andrés Maldonado, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 325 days.

(21) Appl. No.: 18/019,717

(22) PCT Filed: Aug. 4, 2020

(86) PCT No.: PCT/US2020/044887
§ 371 (c)(1),
(2) Date: Feb. 3, 2023

(87) PCT Pub. No.: WO2022/031272
PCT Pub. Date: Feb. 10, 2022

(65) Prior Publication Data
US 2023/0284166 A1  Sep. 7, 2023

(51) Int. Cl.
*H04W 56/00* (2009.01)
(52) U.S. Cl.
CPC ... *H04W 56/0045* (2013.01); *H04W 56/0015* (2013.01)
(58) Field of Classification Search
None
See application file for complete search history.

(56) References Cited

U.S. PATENT DOCUMENTS

| | | |
|---|---|---|
| 2013/0336302 A1 | 12/2013 | Lee et al. |
| 2014/0355597 A1 | 12/2014 | Yeh et al. |
| 2015/0092738 A1 | 4/2015 | Chakraborty et al. |
| 2019/0124612 A1 | 4/2019 | Ruffini et al. |

(Continued)

FOREIGN PATENT DOCUMENTS

WO    2020/031113 A1    2/2020

OTHER PUBLICATIONS

International Search Report and Written Opinion dated Oct. 26, 2020 corresponding to International Patent Application No. PCT/US2020/044887.

(Continued)

*Primary Examiner* — Saad Khawar
(74) *Attorney, Agent, or Firm* — Barta Jones, PLLC

(57) ABSTRACT

Systems, methods, apparatuses, and computer program products for 5G support for time sensitive communication. One method may include sending a report of user equipment capabilities to a communication network. The method may also include receiving a propagation delay compensation configuration from a network node. The method may further include configuring a communication with the network node based on the propagation delay compensation configuration. Further, the propagation delay compensation configuration may take into consideration at least one of propagation delay compensation information from an application function or the report.

13 Claims, 6 Drawing Sheets

(56) References Cited

U.S. PATENT DOCUMENTS

2023/0104424 A1* 4/2023 Diachina ............... H04J 3/0667
 370/350
2023/0171725 A1* 6/2023 Singh ................ H04W 56/0045
 370/350

OTHER PUBLICATIONS

3GPP TR 23.700-20 V0.3.0 (Jan. 2020), Technical Report, 3rd Generation Partnership Project, Technical Specification Group Services and System Aspects; Study on enhanced support of Industrial Internet of Things (IIoT) in the 5G System (5GS) (Release 17), Jan. 2020.
3GPP TS 22.263 V17.1.0 (Jul. 2020), Technical Specification, 3rd Generation Partnership Project; Technical Specification Group Technical Specification Group Services and System Aspects; Service requirements for video, Imaging and audio for professional applications (VIAPA); Stage 1 (Release 17), Jul. 2020.
3GPP TS 23.502 V16.5.0 (Jul. 2020), Technical Specification, 3rd Generation Partnership Project; Technical Specification Group Services and System Aspects; Procedures for the 5G System (5GS); Stage 2 (Release 16), Jul. 2020.
3GPP TS 22.104 V16.5.0 (Jul. 2020), Technical Specification, 3rd Generation Partnership Project; Technical Specification Group Services and System Aspects; Service requirements for cyber-physical control applications in vertical domains; Stage 1 (Release 16), Jul. 2020.

* cited by examiner

| 5SI value | Sync accuracy | Error margin | Time domain | Recommended SIB9/RRC sync message rate (packets/s) | Network-based PD compensation | UE-based PD compensation |
|---|---|---|---|---|---|---|
| 1 | <0.5 µs | | Vertical/5G Clock | 32 (or 64) | No | Yes |
| 2 | 1µs | | Vertical/5G Clock | 32 | Yes | No |
| 3 | 1µs | | Vertical/5G Clock | 32 | No | Yes |
| 4 | 10 µs | | Vertical/5G Clock | 6.25 | Yes | No |
| 5 | 10 µs | | Vertical/5G Clock | 6.25 | No | Yes |
| 6 | 100 µs | | Vertical/5G Clock | 6.25 | Yes | No |
| 7 | 100 µs | | Vertical/5G Clock | 6.25 | No | Yes |
| 8 | 1 ms | | Vertical/5G Clock | 6.25 | No | Yes (Optional) |

FIG. 2

APPLICATION FUNCTION INFLUENCING INTRA-5G PROPAGATION DELAY COMPENSATION

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to apparatuses, systems, and/or methods for 5G support for time sensitive communication.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Some example embodiments are directed to a method. The method may include sending a report of user equipment capabilities to a communication network. The method may also include receiving a propagation delay compensation configuration from a network node. The method may further include configuring a communication with the network node based on the propagation delay compensation configuration. In certain example embodiments, the propagation delay compensation configuration may take into consideration at least one of propagation delay compensation information from an application function or the report.

Other example embodiments may be directed to an apparatus. The apparatus may include at least one processor and at least one memory including computer program code. The at least one memory and computer program code may also be configured to, with the at least one processor, cause the apparatus at least to send a report of user equipment capabilities to a communication network. The apparatus may also be caused to receive a propagation delay compensation configuration from a network node. The apparatus may further be caused to configure a communication with the network node based on the propagation delay compensation configuration. In certain example embodiments, the propagation delay compensation configuration may take into consideration at least one of propagation delay compensation information from an application function or the report.

Other example embodiments may be directed to an apparatus. The apparatus may include means for sending a report of user equipment capabilities to a communication network. The apparatus may also include means for receiving a propagation delay compensation configuration from a network node. The apparatus may further include means for configuring a communication with the network node based on the propagation delay compensation configuration. In certain example embodiments, the propagation delay compensation configuration may take into consideration at least one of propagation delay compensation information from an application function or the report.

In accordance with other example embodiments, a non-transitory computer readable medium may be encoded with instructions that may, when executed in hardware, perform a method. The method may include sending a report of user equipment capabilities to a communication network. The method may also include receiving a propagation delay compensation configuration from a network node. The method may further include configuring a communication with the network node based on the propagation delay compensation configuration. In certain example embodiments, the propagation delay compensation configuration may take into consideration at least one of propagation delay compensation information from an application function or the report.

Other example embodiments may be directed to a computer program product that performs a method. The method may include sending a report of user equipment capabilities to a communication network. The method may also include receiving a propagation delay compensation configuration from a network node. The method may further include configuring a communication with the network node based on the propagation delay compensation configuration. In certain example embodiments, the propagation delay compensation configuration may take into consideration at least one of propagation delay compensation information from an application function or the report.

Other example embodiments may be directed to an apparatus that may include circuitry configured to send a report of user equipment capabilities to a communication network. The apparatus may also include circuitry configured to receive a propagation delay compensation configuration from a network node. The apparatus may further include circuitry configured to configure a communication with the network node based on the propagation delay compensation configuration. In certain example embodiments, the propagation delay compensation configuration may take into consideration at least one of propagation delay compensation information from an application function or the report.

Certain example embodiments may be directed to a method. The method may include receiving propagation delay compensation information from an application function. The method may also include receiving a report of user equipment capabilities from a user equipment. The method may further include determining a propagation delay compensation policy for communications between the user equipment and a network node based on at least one of the propagation delay compensation information or the report. In addition, the method may include sending the propagation delay compensation policy to the network node.

Other example embodiments may be directed to an apparatus. The apparatus may include at least one processor and at least one memory including computer program code. The at least one memory and computer program code may be configured to, with the at least one processor, cause the apparatus at least to receive propagation delay compensation information from an application function. The apparatus may also be caused to receive a report of user equipment capabilities from a user equipment. The apparatus may further be caused to determine a propagation delay compensation policy for communications between the user equipment and a network node based on at least one of the propagation delay compensation information or the report. In addition, the apparatus may be caused to send the propagation delay compensation policy to the network node.

Other example embodiments may be directed to an apparatus. The apparatus may include means for receiving propagation delay compensation information from an application function. The apparatus may also include means for receiving a report of user equipment capabilities from a user equipment. The apparatus may further include means for determining a propagation delay compensation policy for communications between the user equipment and a network node based on at least one of the propagation delay compensation information or the report. In addition, the apparatus may include means for sending the propagation delay compensation policy to the network node.

In accordance with other example embodiments, a non-transitory computer readable medium may be encoded with instructions that may, when executed in hardware, perform a method. The method may include receiving propagation delay compensation information from an application function. The method may also include receiving a report of user equipment capabilities from a user equipment. The method may further include determining a propagation delay compensation policy for communications between the user equipment and a network node based on at least one of the propagation delay compensation information or the report. In addition, the method may include sending the propagation delay compensation policy to the network node.

Other example embodiments may be directed to a computer program product that performs a method. The method may include receiving propagation delay compensation information from an application function. The method may also include receiving a report of user equipment capabilities from a user equipment. The method may further include determining a propagation delay compensation policy for communications between the user equipment and a network node based on at least one of the propagation delay compensation information or the report. In addition, the method may include sending the propagation delay compensation policy to the network node.

Other example embodiments may be directed to an apparatus that may include circuitry configured to receive propagation delay compensation information from an application function. The apparatus may also include circuitry configured to receive a report of user equipment capabilities from a user equipment. The apparatus may further include circuitry configured to determine a propagation delay compensation policy for communications between the user equipment and a network node based on at least one of the propagation delay compensation information or the report. In addition, the apparatus may include circuitry configured to send the propagation delay compensation policy to the network node.

BRIEF DESCRIPTION OF THE DRAWINGS

For proper understanding of example embodiments, reference should be made to the accompanying drawings, wherein:

FIG. 2 illustrates an example table of synchronization level profiles.

DETAILED DESCRIPTION

Figure 1:
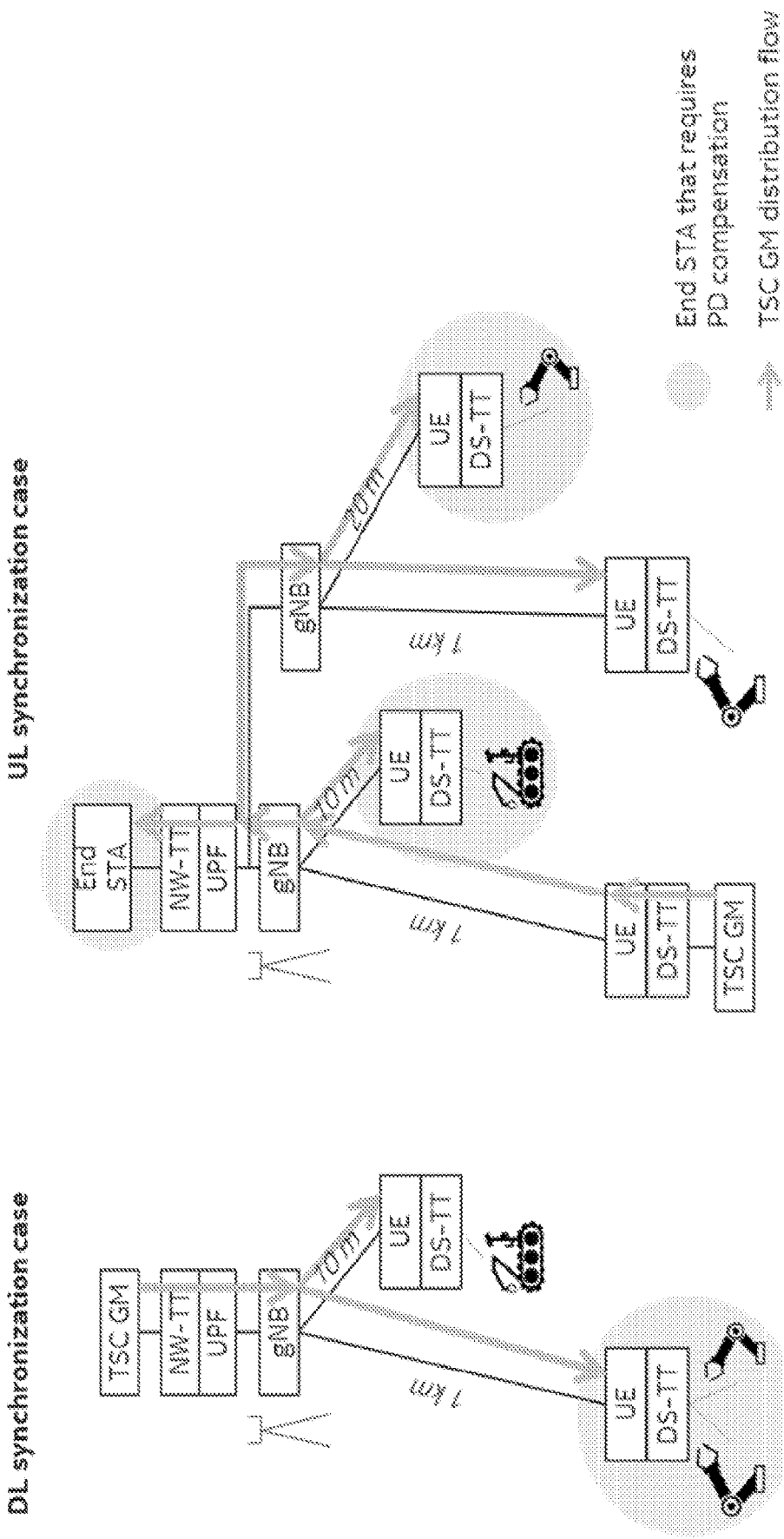
FIG. 1 illustrates an example of synchronization cases.

It will be readily understood that the components of certain example embodiments, as generally described and illustrated in the figures herein, may be arranged and designed in a wide variety of different configurations. The, the following detailed description of some example embodiments of systems, methods, apparatuses, and computer program products may be for 5G time sensitive communication (TSC), including, for example, compensation of propagation delay, and application function influencing intra-5G propagation delay compensation. This is not intended to limit the scope of certain example embodiments, but is representative of some example embodiments.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

In 3$^{rd}$ Generation Partnership Project (3GPP), a 5G system (5GS) may provide support for time sensitive communications (TSC), which can be extended to new verticals. The exposure framework may provide enhanced external exposure of network capability that allows any application function (AF) that has knowledge of deterministic application requirements to be able to request TSC services from the 5GS, and as authorized, be notified of pertinent network events. Mechanisms to support time synchronization, request time synchronization with specified requirements, and supply information that can be used to optimize and configure time synchronization for connected devices.

The delivery of absolute time information may be handled through SIB9 messages (via unicast DLInformationTransfer IE) or broadcast (SIB9). To achieve an accurate absolute time synchronization distribution for time synchronization services, it may be desirable that the user equipment (UE) has a good understanding of the reference time. To achieve this, the propagation delay (PD) between the UE and base station in 5G new radio (gNB) may be estimated. In addition, PD compensation may be applied to the reference time information sent from the gNB to the UE to fulfill the X μs accuracy requirement. Furthermore, PD compensation may be beneficial from around 100 m distance of the UE-gNB, and may be needed from about 200 m.

FIG. 1 illustrates an example of synchronization cases. In particular, FIG. 1 illustrates a downlink (DL) synchronization case and an uplink (UL) synchronization case. In addition to the UE-gNB distance, the relevance of PD compensation may depend on the synchronization scenario considered. For example, as illustrated in FIG. 1, the synchronization scenario may involve UL synchronization to other UEs or end stations behind an N6 interface, or DL synchronization. Further, PD compensation may be provided to adjust the time progression at the UE or the gNB after transmission or timestamping. In certain cases, the AF may know the environment and type of deployment of the UE better than the 5G network, and some decisions related to PD compensation may be taken holistically on behalf of the 5G network. For instance, the AFs may have knowledge of the proximity and PD compensation of the AFs' UEs, and may provide this information to the 5GS.

Certain exposure capabilities for time synchronization services may include various requirements. Some of these requirements may include, for example, 5GS support for time synchronization to 5GS, time domain, and synchronization accuracy. With regard to synchronization accuracy, it may be applicable in terms of required generic precision time protocol (gPTP) rate for one or more data network (DN) port, synchronization accuracy in microseconds per device link, and number of connected gPTP slaves in case 5GS provides the timing domain. However, in some cases, the AF/5GS may not be able to exchange information to assist in the decision if PD compensation should be enabled/disabled, and when and/or where PD compensation should be applied (i.e., at the UE side or at the network side).

FIG. 2 illustrates an example table of synchronization level profiles. In particular, FIG. 2 illustrates synchronization level scalar "5SI," which may reference network/UE-based PD compensation support within a combination of parameters associated with the synchronization profile for the UE. As illustrated in FIG. 2, each level profile may be characterized by certain 5SI values, synchronization accuracy, error margin, time domain, recommended SIB9/radio resource control (RRC) synchronization message, network-based PD compensation, and UE-based PD compensation.

Certain example embodiments may provide enhancements to the 5GS framework for obtaining AF input for PD compensation. For instance, in certain example embodiments, the UE may provide its capability to support PD compensation to the network. In some example embodiments, the capability may be provided to the network via the user plane (UP), or the control plane (CP). In certain example embodiments, the UE may also provide its capability as part of UE radio capabilities. In addition, according to certain example embodiments, the AF may know the capabilities for PD compensation of its devices, and it may also know the intended deployment/service environment better than the 5GS radio access network (RAN) can self-detect or know from the UE capability. According to certain example embodiments, the AF input and/or the UE capabilities may be used for PD estimation and PD compensation policy/configuration determination. That is, in certain example embodiments, the AF input together with the UE capabilities, may be used to determine how to configure PD compensation. In other example embodiments, the PD may be estimated and then compensated at the UE or the network side.

According to certain example embodiments, the AF may influence or control the PD compensation policy in the 5G network. For the AF to have such influence or control, the UE, the AF, and the 5G network may exchange certain settings. In certain example embodiments, the settings may include settings related to network or device capabilities to perform PD compensation. The settings may also include settings related to disabling or enabling PD compensation for a UE or a group of UEs. In addition, the settings may include settings related to UE time synchronization or Tx UE-Rx UE time synchronization support (i.e., to indicate the master and slave).

Figure 3:
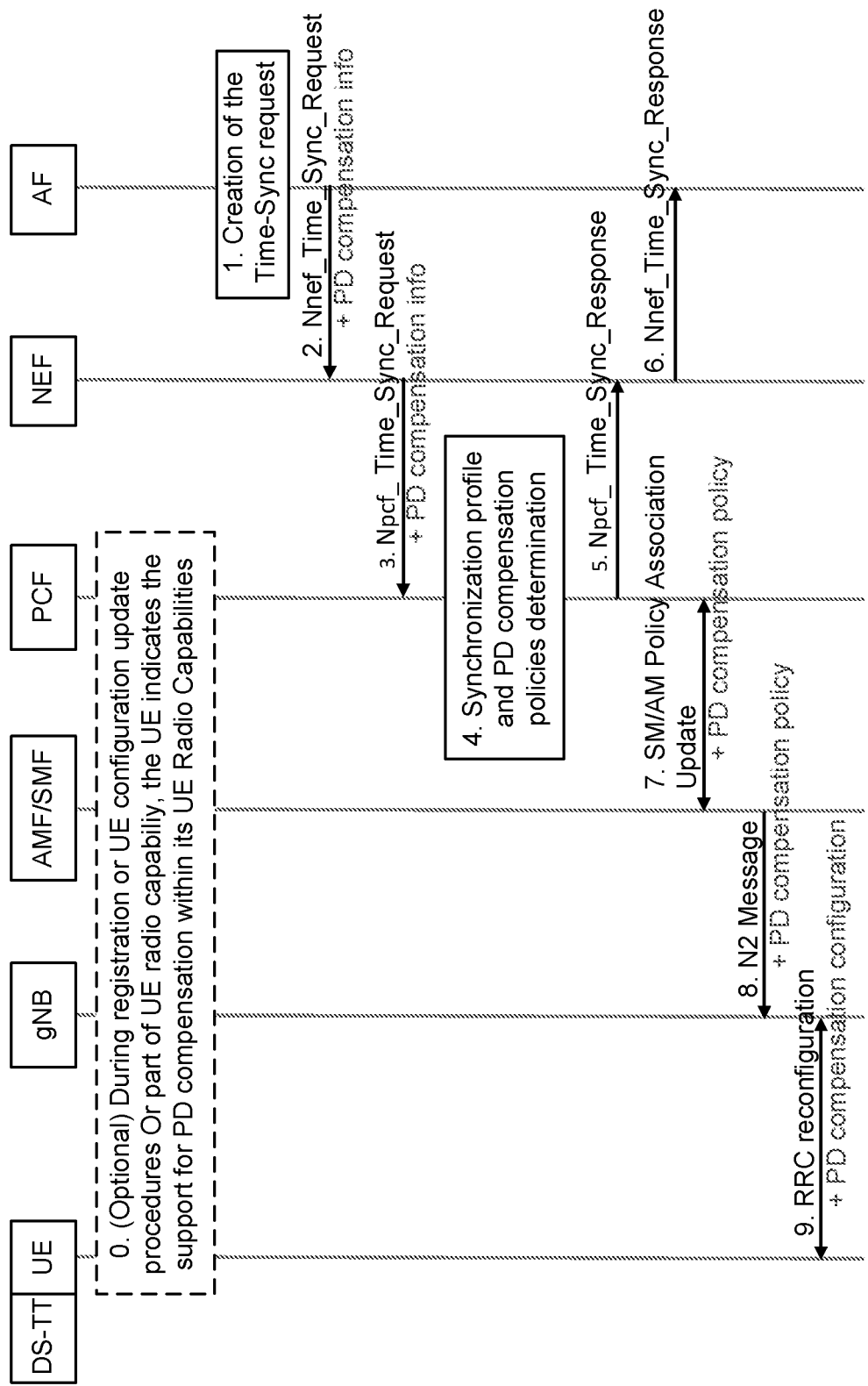
FIG. 3 illustrates an example signal flow diagram, according to certain example embodiments.

FIG. 3 illustrates an example signal flow diagram, according to certain example embodiments. In particular, FIG. 3 illustrates how an AF may influence a PD compensation procedure. At 0, the UE may optionally, during registration or UE configuration update procedures, or as part of the UE radio capability, indicate its support for PD compensation within its UE radio capabilities. At 1, the AF may create a time-synchronization request. At 2, the AF may send the time-synchronization request along with PD compensation information to a network exposure function (NEF). In certain example embodiments the PD compensation information may include one or a combination of any one of IDs of target UEs, spatial validity condition, the UE's location, NW or UE preferred PD compensation, the UE's support for PD compensation, or enable/disable PD compensation. At 3, the NEF may forward the time-synchronization request and the PD compensation information to the policy control function (PCF). At 4, after receiving the time-synchronization request and PD compensation information, the PCF may determine a synchronization profile and PD compensation policies based on the request and PD compensation information. According to certain example embodiments, the synchronization profile may include the information shown in the table of FIG. 2 together with other potential parameters such as distributed method for time synchronization, and associated charging policies (if needed for c-plane synchronization). In certain example embodiments, the determination of the synchronization profile and PD compensation policy may be left for implementation at a specific network function based on certain 5GS constraints, operator local policies, AF request, and UE subscription.

After the determination is made at the PCF, at 5, the PCF may send a response to the NEF. At 6, the NEF may forward the response to the AF. At 7, the PCF and the access and mobility management function (AMF) and session management function (SMF) may exchange SM/AM policy association updates along with the PD compensation policy. In some example embodiments, the content of the SM/AM policy association updates may be found in 3GPP TS 23.502, clause 5.2.5. Further, in certain example embodiments, this solution may include the policy for PD compensation (e.g., enable/disable PD compensation, NW/UE based PD compensation). At 8, the AMF/SMF may send a message along with the PD compensation policy to the gNB. At 9, the gNB and UE may exchange RRC reconfiguration information along with PD compensation configuration(s)/information based on the PD compensation policy received at the gNB. At 9, the UE may also implement the PD compensation configuration and RRC reconfiguration. According to certain example embodiments, although the UE may receive the PD compensation configuration/information using RRC reconfiguration, other RRC signaling messages may be used depending on whether the NW needs to reconfigure the UE or only provide some kind of notification/update.

According to certain example embodiments, the 5G network (NW) may include, for example, network entities such as a SMF, AMF, PCF, NEF and gNB. In certain example embodiments, the NW may have the freedom to use the PD compensation information contained in the AF's request to influence or control how PD compensation is configured for the requested synchronization service. That is, according to certain embodiments, the 5GS/5G network may have the final decision as to whether or not the input of the AF is actually used for PD estimation, or how the PD compensation is configured for the requested synchronization service. In certain embodiments, the decision may depend on the synchronization service requirements, UE capability, and AF request. For example, if the synchronization accuracy is not strict (e.g., more than 100 microseconds), the PD compensation may not be enabled in the NW even if the AF requests it. By not enabling the PD compensation, it may be possible to avoid additional errors due to estimation inaccuracies.

In certain example embodiments, it may be possible to identify certain impacts of PD compensation. For instance, new PD compensation set of information exchange from the AF to NW may be identified. In addition, new information elements (IEs) between core network (CN) entities and the gNB to distribute the PD compensation configuration/policy may be identified. In this regard, the PCF may obtain input from the serving gNB before selecting the PD compensation policy. A further impact that may be identified is new PD compensation policy determination at the PCF based on the AF's request. This may include, for example, time-synchronization service requirements and PD compensation information. According to certain embodiments, the PD compensation policy may include enable/disable PD compensation command, the entity responsible of PD compensation (i.e., UE, gNB, or UPF) which may be one that adjusts the time progression to the time synchronization packets, triggers to (de)activate PD compensation (e.g., for mobile UEs).

According to certain example embodiments, due to the variety of synchronization scenarios, the AF's request to influence PD compensation may target UEs in different ways. For instance, one way that the AF request may target UEs may be to explicitly targeting a UE or a group of UEs. In this regard, the AF may use general public subscription identifiers (GPSIs) or other ways of identifying the UE(s) in the network (e.g., UEs connected to a specific DN) including, for example, by using IP/medium access control (MAC) UE addresses. Another way that the AF request may target UEs may be using a spatial validity condition to target UEs within an area of interest. For instance, the AF or network may specify the use of PD compensation represented by a list of geographic zone identifiers. In this case, the spatial condition may be conditional to the location of the grand master (GM) and clock sink UEs.

Figure 4:
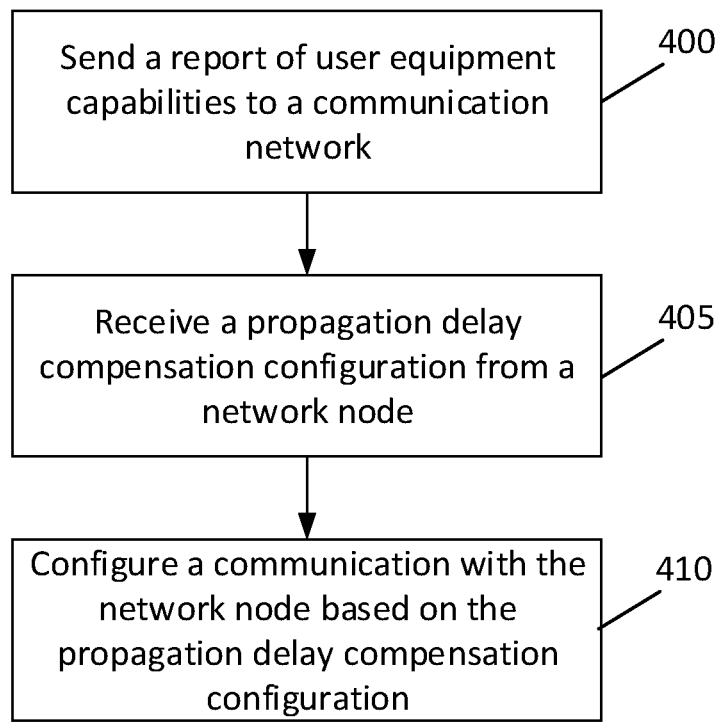
FIG. 4 illustrates a flow diagram of a method, according to certain example embodiments.

FIG. 4 illustrates a flow diagram of a method, according to an example embodiment. In an example embodiment, the flow diagram of FIG. 4 may be performed by a mobile station and/or UE, for instance similar to apparatus 10 illustrated in FIG. 6(a). According to an example embodiment, the method of FIG. 4 may include, at 400, sending a report of user equipment capabilities to a communication network. The method may also include, at 405, receiving a propagation delay compensation configuration from a network node. The method may further include, at 410, configuring a communication with the network node based on the propagation delay compensation configuration. In certain example embodiments, the propagation delay compensation configuration may take into consideration at least one of propagation delay compensation information from an application function or the report.

According to certain example embodiments, the propagation delay compensation configuration may take into consideration the report and not the propagation delay information. According to other example embodiments, the propagation delay compensation configuration may take into consideration both the propagation delay compensation information and the report. According to further example embodiments, the propagation delay compensation configuration may include an enable or disable propagation delay compensation command, or a trigger to activate or deactivate propagation delay compensation. In some example embodiments, the report may include a user equipment's capability to support propagation delay compensation.

Figure 5:
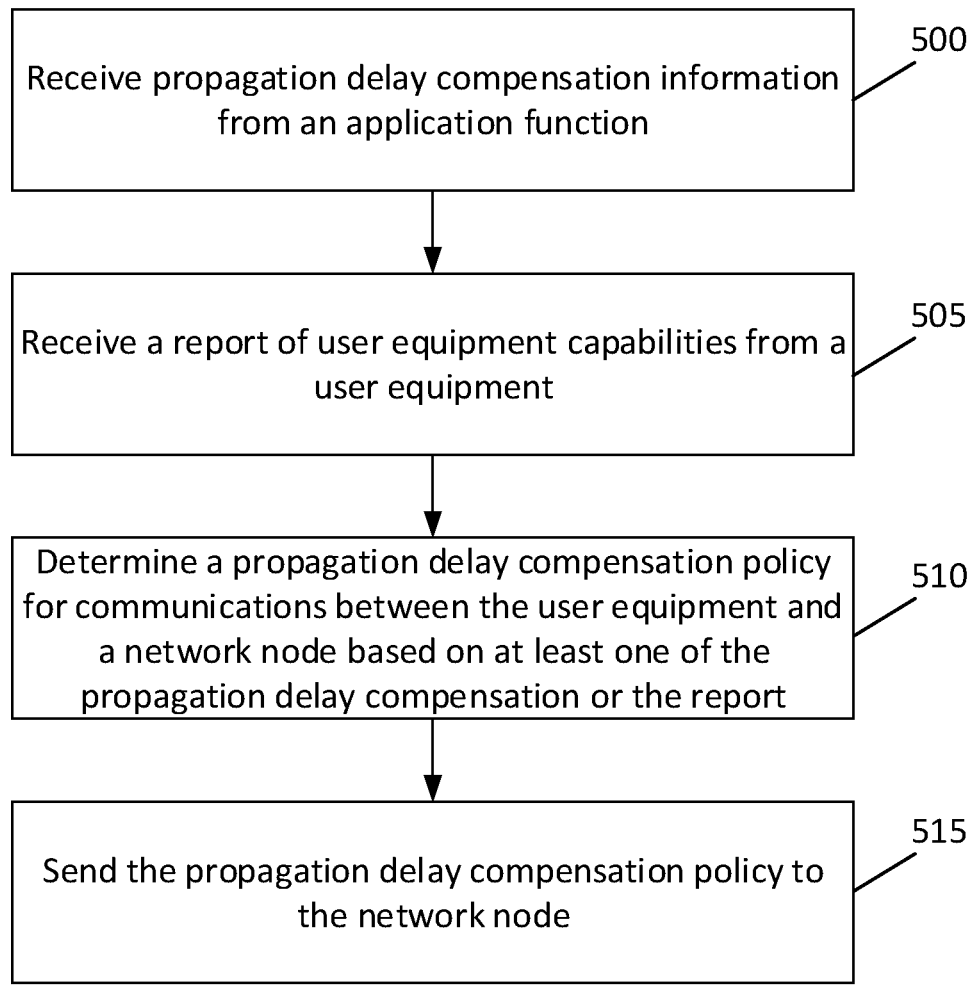
FIG. 5 illustrates a flow diagram of another method, according to certain example embodiments.

FIG. 5 illustrates a flow diagram of another method, according to certain example embodiments. In an example embodiment, the method of FIG. 5 may be performed by a network entity, network node, or a group of multiple network elements in a 3GPP system, such as LTE or 5G-NR. For instance, in an example embodiment, the method of FIG. 5 may be performed by a 5GS, 5G network, or communication network, for instance similar to apparatus 20 illustrated in FIG. 6(b).

According to an example embodiment, the method of FIG. 5 may include, at 500, receiving propagation delay compensation information from an application function. The method may also include, at 505, receiving a report of user equipment capabilities from a user equipment. The method may further include, at 510, determining a propagation delay compensation policy for communications between the user equipment and a network node based on at least one of the propagation delay compensation information or the report. In addition, the method may include, at 515, sending the propagation delay compensation policy to the network node.

According to certain example embodiments, the determination of the propagation delay compensation policy may be based on the report and not the propagation delay compensation information. According to other example embodiments, the determination of the propagation delay compensation policy may be based on the propagation delay compensation information and the report. In certain example embodiments, the determination of the propagation delay compensation policy may be based on the propagation delay compensation information without assistance from the user equipment. In other example embodiments, the determination of the propagation delay compensation policy based on the propagation delay compensation information without assistance from the user equipment may include receiving an indication from the application function of the use of network propagation delay compensation, or an indication of disabling the network propagation delay compensation.

According to further example embodiments, the propagation delay compensation information may be received with a time-synchronization request. In certain example embodiments, the time-synchronization request may target the user equipment or a group of user equipments example embodiments, the time-synchronization request may target the user equipment or the group of user equipments within an area of interest, or the time-synchronization request may target the user equipment or the group of user equipments without defining an area of interest. In some example embodiments, the determination of the propagation delay compensation policy is further based on a synchronization service requirement. In other example embodiments, the method further comprises receiving input from the network node before the propagation delay compensation policy is determined.

According to certain example embodiments, the propagation delay compensation policy may include an enable or disable propagation delay compensation command, or a trigger to activate or deactivate propagation delay compensation. According to other example embodiments, the propagation delay compensation information comprises the user equipment's capabilities for propagation delay compensation, an intended deployment, or a service environment of the user equipment. According to further example embodiments, the report comprises the user equipment's capability to support propagation delay compensation.

Figure 6A:
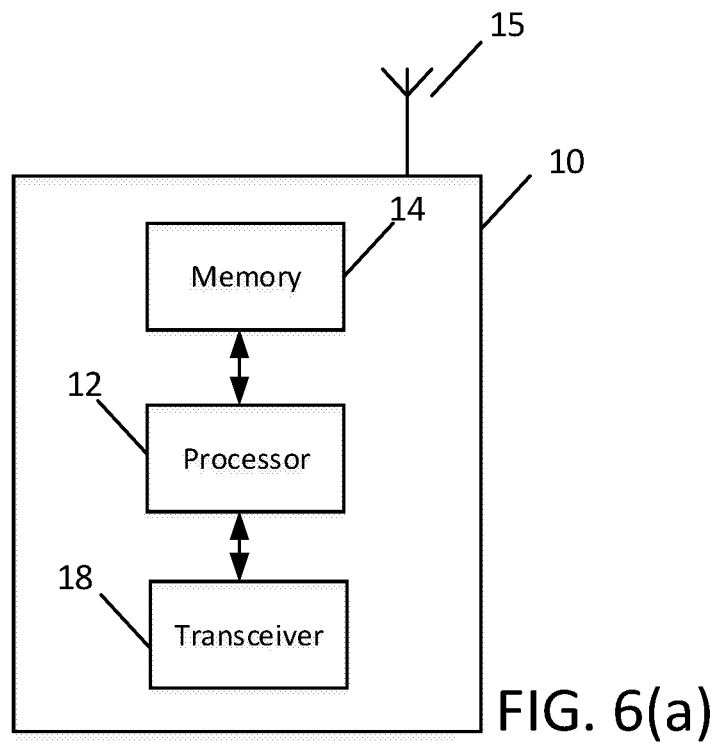
FIG. 6(a) illustrates an example block diagram of an apparatus, according to an embodiment.
Figure 6B:
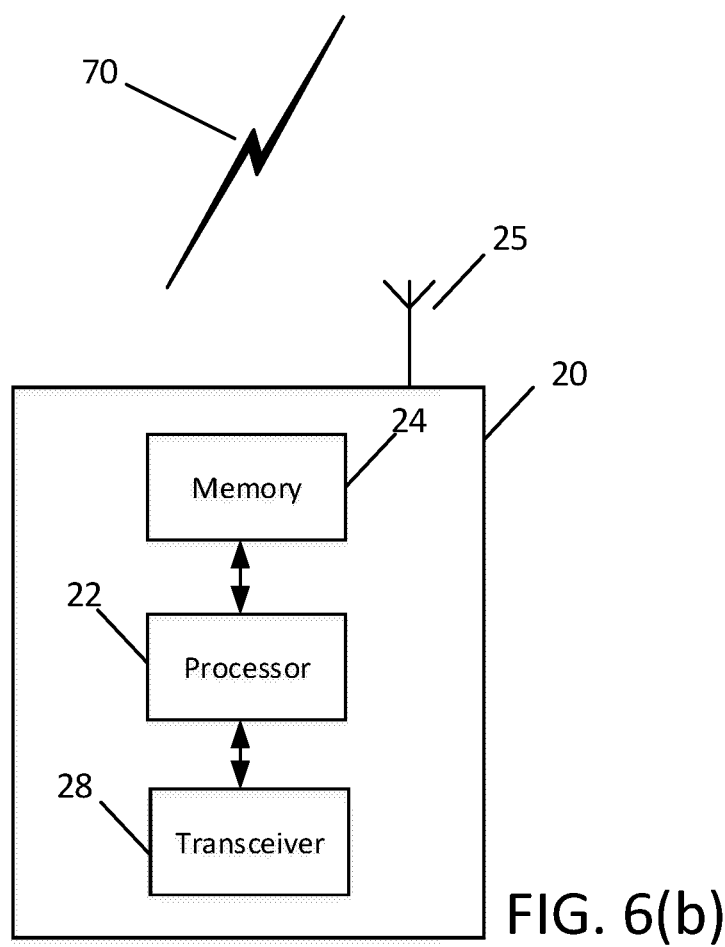
FIG. 6(b) illustrates an example block diagram of another apparatus, according to an example embodiment.

FIG. 6(a) illustrates an apparatus 10, according to certain example embodiments. In certain example embodiments, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, or the like.

In certain example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 6(a).

As illustrated in the example of FIG. 6(a), apparatus 10 may include or be coupled to a processor 12 for processing information and executing instructions or operations. Processor 12 may be any type of general or specific purpose processor. In particular, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-4.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-4.

In certain example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in certain example embodiments, apparatus 10 may include an input and/or output device (I/O). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

As discussed above, according to certain example embodiments, apparatus 10 may be a UE for example. According to certain embodiments, apparatus 10 may be controlled by memory 14 and processor 12 to perform the functions associated with example embodiments described herein. For instance, in certain example embodiments, apparatus 10 may be controlled by memory 14 and processor 12 to send a report of user equipment capabilities to a communication network. Apparatus 10 may also be controlled by memory 14 and processor 12 to receive a propagation delay compensation configuration from a network node. Apparatus 10 may further be controlled by memory 14 and processor 12 to configure a communication with the network node based on the propagation delay compensation configuration. According to certain example embodiments, the propagation delay compensation configuration may take into consideration at least one of propagation delay compensation information from an application function or the report.

FIG. 6(*b*) illustrates an apparatus 20, according to certain example embodiments. In an example embodiment, the apparatus 20 may be a network element, node, host, or server in a communication network or serving such a network. For example, apparatus 20 may be a base station, a Node B, an evolved Node B (eNB), 5G Node B or access point, next generation Node B (NG-NB or gNB), AMF, SMF, PCF, NEF, AF, WLAN access point, and/or a collection of any combination of such elements, associated with a radio access network (RAN), such as an LTE network, 5G or NR. It should be noted that one of ordinary skill in the art would understand that apparatus 20 may include components or features not shown in FIG. 6(*b*).

As illustrated in the example of FIG. 6(*b*), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6(*b*), multiple processors may be utilized according to other embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-3 and 5.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-3 and 5.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in certain example embodiments, apparatus 20 may include an input and/or output device (I/O device).

In certain example embodiments, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to certain example embodiments, processor 22 and memory 24 may be included in or may form a part of processing circuitry or control circuitry. In addition, in certain example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 20 may be a network element, node, host, or server in a communication network or serving such a network. For example, apparatus 20 may be a a base station, a Node B, an evolved Node B (eNB), 5G Node B or access point, next generation Node B (NG-NB or gNB), AMF, SMF, PCF, NEF, AF, WLAN access point, and/or a collection of any combination of such elements, associated with a radio access network (RAN), such as an LTE network, 5G or NR. According to certain embodiments, apparatus 20 may be controlled by memory 24 and processor 22 to perform the functions associated with any of the embodiments described herein.

For instance, in certain example embodiments, apparatus 20 may be controlled by memory 24 and processor 22 to receive propagation delay compensation information from an application function. Apparatus 20 may also be controlled by memory 24 and processor 22 to receive a report of user equipment capabilities from a user equipment. Apparatus 20 may further be controlled by memory 24 and processor 22 to determine a propagation delay compensation policy for communications between the user equipment and a network node based on at least one of the propagation delay compensation information or the report. In addition, apparatus 20 may be controlled by memory 24 and processor 22 to send the propagation delay compensation policy to the network node.

Further example embodiments may provide means for performing any of the functions, steps, or procedures described herein. For example, certain example embodiments may be directed to an apparatus that includes means for sending a report of user equipment capabilities to a communication network. The apparatus may also include means for receiving a propagation delay compensation configuration from a network node. The apparatus may further include means for configuring a communication with the network node based on the propagation delay compensation configuration. In certain example embodiments, the propagation delay compensation configuration may take into consideration at least one of propagation delay compensation information from an application function or the report.

Other example embodiments may be directed to a further apparatus that includes means for receiving propagation delay compensation information from an application function. The apparatus may also include means for receiving a report of user equipment capabilities from a user equipment. The apparatus may further include means for determining a propagation delay compensation policy for communications between the user equipment and a network node based on at least one of the propagation delay compensation information or the report. In addition, the apparatus may include means for sending the propagation delay compensation policy to the network node.

Certain example embodiments described herein provide several technical improvements, enhancements, and/or advantages over existing technological processes and constitute an improvement at least to the technological field of wireless network control and management. In some example embodiments, it may be possible to ensure that a moving UE remains in the network that has connectivity towards TD as required for the TSN end devices. It may also be possible to ensure that the absolute time synchronization is not affected by a handover situation. In addition, it may be possible to enhance the 5GS framework for obtaining AF input for PD compensation configuration. According to other example embodiments, it may be possible to ease the configuration of the time synchronization service for scenarios with tight synchronization accuracies (e.g., 0.5 microseconds) as the AF provides assistance information to the network.

A computer program product may comprise one or more computer-executable components which, when the program is run, are configured to carry out some of the various example embodiments described herein. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments. In order to determine the metes and bounds of the example embodiments, therefore, reference should be made to the appended claims.

| Partial Glossary | |
|---|---|
| 5GS | 5G System |
| 5SI | 5G Synchronization Identifier |
| AF | Application Function |
| AMF | Access Management Function |
| BS | Base Station |
| CN | Core Network\ |
| DL | Downlink |
| DN | Data Network |
| GM | Grand Master |
| eNB | Enhanced Node B |
| gNB | 5G or NR Base Station |
| gPTP | Generic Precision Time Protocol |
| GPSI | General Public Subscription Identifier |
| LTE | Long Term Evolution |
| NEF | Network Exposure Function |
| NR | New Radio |
| NW | 5G Network |
| PCF | Policy Control Function |
| PD | Propagation Delay |
| RAN | Radio Access Network |
| RRC | Radio Resource Control |
| SIB | System Information Block |
| SMF | Session Management Function |
| STA | Station |
| TSC | time Sensitive Communications |
| UE | User Equipment |
| UL | Uplink |
| UPF | User Plane Function |

What is claimed is:

1. A method, comprising:
   receiving propagation delay compensation information from an application function, wherein the propagation delay compensation information is received with a time-synchronization request;
   receiving a report of user equipment capabilities from a user equipment; and
   determining a propagation delay compensation policy for communications between the user equipment and a network node based on the propagation delay compensation information and the report, wherein the propagation delay compensation policy comprises an enable or disable propagation delay compensation command, or a trigger to activate or deactivate propagation delay compensation.

2. The method according to claim 1,
   wherein the time-synchronization request targets the user equipment or a group of user equipments,
   wherein the time-synchronization request targets the user equipment or the group of user equipments within an area of interest, or
   wherein the time-synchronization request targets the user equipment or the group of user equipments without defining an area of interest.

3. The method according to claim 1, wherein the determination of the propagation delay compensation policy is further based on a synchronization service requirement.

4. The method according to claim 1, further comprising receiving input from the network node before the propagation delay compensation policy is determined.

5. The method according to claim 1, wherein the propagation delay compensation information comprises capabilities of the user equipment for the propagation delay compensation, an intended deployment, or a service environment of the user equipment.

6. The method according to claim 1, wherein the report comprises information regarding capability of the user equipment to support the propagation delay compensation.

7. A non-transitory computer readable medium comprising program instructions stored thereon that, when executed in hardware, cause the hardware to perform the method according to claim 1.

8. An apparatus, comprising:
   at least one processor; and
   at least one memory storing instructions that, when executed by the at least one processor, cause the apparatus at least to:
   receive propagation delay compensation information from an application function, wherein the propagation delay compensation information is received with a time-synchronization request;
   receive a report of user equipment capabilities from a user equipment; and
   determine a propagation delay compensation policy for communications between the user equipment and a network node based on at least one of the propagation delay compensation information and the report,
   wherein the propagation delay compensation policy comprises an enable or disable propagation delay compensation command, or a trigger to activate or deactivate propagation delay compensation.

9. The apparatus according to claim 8,
   wherein the time-synchronization request targets the user equipment or a group of user equipments,
   wherein the time-synchronization request targets the user equipment or the group of user equipments within an area of interest, or
   wherein the time-synchronization request targets the user equipment or the group of user equipments without defining an area of interest.

10. The apparatus according to claim 8, wherein the determination of the propagation delay compensation policy is further based on a synchronization service requirement.

11. The apparatus according to claim 8, wherein the apparatus further comprises reception of input from the network node before the propagation delay compensation policy is determined.

12. The apparatus according to claim 8, wherein the propagation delay compensation information comprises capabilities of the user equipment for the propagation delay compensation, an intended deployment, or a service environment of the user equipment.

13. The apparatus according to claim 8, wherein the report comprises capabilities of the user equipment to support the propagation delay compensation.

* * * * *